(12) United States Patent
Suzuki

(10) Patent No.: US 6,343,634 B1
(45) Date of Patent: Feb. 5, 2002

(54) PNUEMATIC TIRE INCLUDING GROUNDING TERMINALS MADE OF CONDUCTIVE RUBBER COMPOUND

(75) Inventor: Kazuya Suzuki, Shirakawa (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/458,709

(22) Filed: Dec. 13, 1999

(30) Foreign Application Priority Data

Dec. 17, 1998 (JP) .............................. 10-359618

(51) Int. Cl.[7] .................... B60C 1/00; B60C 11/13; B60C 19/08; B60C 101/00
(52) U.S. Cl. .................. 152/152.1; 152/209.5; 152/209.19; 152/DIG. 2
(58) Field of Search ................ 152/152.1, DIG. 2, 152/209.15, 209.19, 209.5

(56) References Cited

U.S. PATENT DOCUMENTS

| | | | | |
|---|---|---|---|---|
| 2,641,294 A | * | 6/1953 | Bridgefield | ............ 152/DIG. 2 |
| 5,937,926 A | * | 8/1999 | Powell | ................. 152/DIG. 2 |
| 6,044,882 A | * | 4/2000 | Crawford et al. | ...... 152/DIG. 2 |

FOREIGN PATENT DOCUMENTS

| | | | | |
|---|---|---|---|---|
| CH | 597008 | | 3/1978 | |
| DE | 4417914 | * | 11/1995 | ............ 152/DIG. 2 |
| EP | 0718127 | | 6/1996 | |
| EP | 0747243 | | 12/1996 | |
| EP | 0847880 | | 6/1998 | |
| EP | 0878330 | | 11/1998 | |
| EP | 0890460 | | 1/1999 | |
| GB | 903389 | * | 8/1962 | ............ 152/209.19 |
| JP | 2-189204 | * | 7/1990 | ............ 152/209.19 |
| JP | 8-183309 | * | 7/1996 | ............ 152/209.19 |
| JP | 971112 | | 3/1997 | |
| JP | 09071112 | | 7/1997 | |

* cited by examiner

Primary Examiner—Steven D. Maki
(74) Attorney, Agent, or Firm—Birch, Stewart, Kolasch & Birch, LLP

(57) ABSTRACT

A pneumatic tire comprises a tread rubber extending over a ground contacting region of the tire, tread grooves disposed in the ground contacting region, static electricity grounding means comprising grounding terminals and a collector, the collector and grounding terminals being made of a conductive rubber compound containing at least 15 phr of carbon black to have a volume resistivity of less than 100 megaohm cm, and the tread rubber being made of a low-hysteresis-loss rubber compound containing silica as a reinforcing agent and having a volume resistivity more than that of the electrically conductive rubber compound, wherein the collector is disposed radially inside the tread grooves, and the grounding terminals are disposed in the tread grooves and extend radially outwardly from the collector to the level of the ground contacting region at least.

10 Claims, 3 Drawing Sheets

PNUEMATIC TIRE INCLUDING GROUNDING TERMINALS MADE OF CONDUCTIVE RUBBER COMPOUND

The present invention relates to a pneumatic tire having a tread portion made of a low-hysteresis-loss rubber compound and static electricity grounding means.

In recent years, in order to lessen the fuel consumption of vehicles, pneumatic tires having a tread portion made of a rubber compound mainly reinforced by silica instead of carbon black have been proposed. The tread rubber therefore, shows a low hysteresis loss, and as a result, the rolling resistance of the tire can be decreased. In such a silica-reinforced rubber, however, the electrical resistance is very high. Therefore, it is necessary to provide a means of eliminating static electricity of vehicles.

In the laid-open Japanese patent application No. JP-A-9-71112, for example, a pneumatic tire having static electricity grounding means is disclosed, wherein the tread portion (A) is made of a silica-reinforced rubber (b) and an electrically conductive carbon-reinforced rubber (a) as shown in FIG. 4, and the conductive carbon-reinforced rubber (a) is provided with parts (a1) extending radially outwardly to the ground contacting face (bs) of the tread portion.

In this structure, the ground contacting region is defined by two kinds of rubber compounds. Therefore, uneven wear is liable to occur therebetween. If the radially outwardly extending parts (a1) wear faster than the tread rubber (b), the electrical resistance between the tire and the ground increases. If the tread rubber (b) wears faster than the parts (a1), there is a possibility that the grip performance deteriorates. Further, it is difficult to form the radially extending parts (a1) with accuracy because the rubber is softened during vulcanizing the tire and flows more or less. Furthermore, an increase in the tire making processes and/or an increase in the facility cost may be unavoidable.

It is therefore, an object of the present invention to provide a pneumatic tire which can solve the above-mentioned problems, namely, the increase in the electrical resistance and deterioration of the grip performance due to the uneven wear, and the lowering of accuracy, and the increase in the tire making processes and/or facility cost.

According to the present invention, a pneumatic tire comprises a tread rubber extending over a ground contacting region of the tire, tread grooves disposed in the ground contacting region, static electricity grounding means comprising grounding terminals and a collector, the collector and grounding terminals being made of a conductive rubber compound containing at least 15 phr of carbon black to have a volume resistivity of less than 100 megaohm cm, and the tread rubber being made of a low-hysteresis-loss rubber compound containing silica as a reinforcing agent and having a volume resistivity more than that of the electrically conductive rubber compound, wherein the collector is disposed radially inside the tread grooves, and the grounding terminals are disposed in the tread grooves and extend radially outwardly from the collector to the level of the ground contacting region at least.

An embodiment of the present invention will now be described in detail in conjunction with the accompanying drawings.

FIG. 1 is a cross sectional view of an embodiment of the present invention.

FIGS. 2(A) and 2(B) are enlarged cross sectional views each showing an example of the static electricity grounding means thereof.

Figure 1:
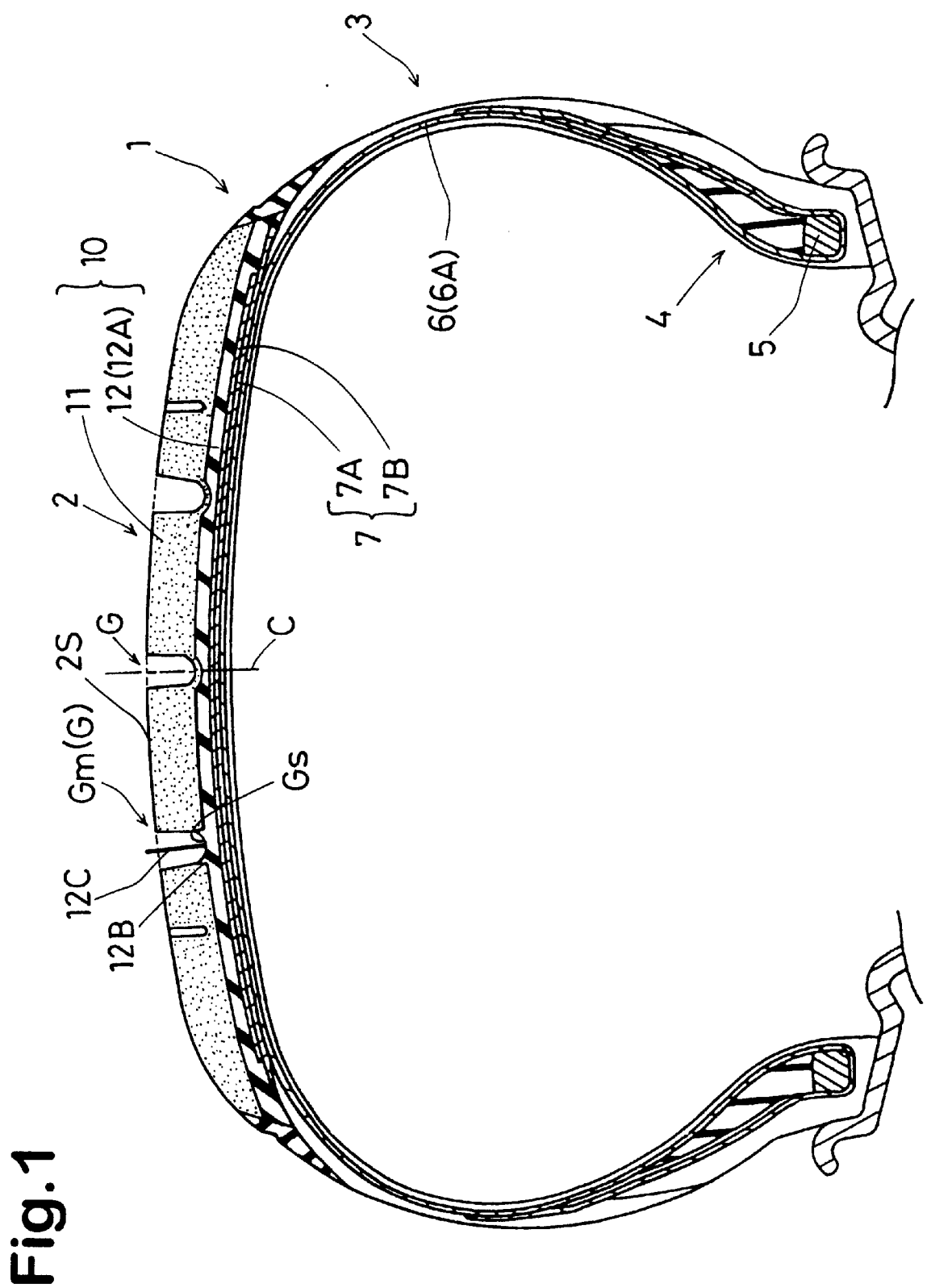

In FIG. 1, a pneumatic tire 1 according to the present invention comprises a tread portion 2, a pair of sidewall portions 3, a pair of bead portions 4 with a bead core 5 therein, a carcass 6 extending between the bead portions 4, and a belt 7 disposed radially outside the carcass 6. In this embodiment, the tire 1 is a radial tire for passenger cars.

The carcass 6 comprises at least one ply 6A, in this embodiment only one ply, of cords arranged radially at an angle of from 75 to 90 degree with respect to the tire equator C, and extending between the bead portions 4 through the tread portion 2 and sidewall portions 3, and turned up around the bead core 5 in each of the bead portions to be secured thereto.

The belt comprises a breaker belt 7 and optionally a band belt (not shown). The breaker belt 7 is composed of at least two plies 7A and 7B of cords, wherein the cords of each ply are laid at an angle of not more than 30 degree with respect to the tire equator C in parallel with each other but crosswise to those of the other ply. For the breaker cords, steel cords are used in this example. But other metallic cords, carbon fiber cords or the like may be used. Further, nonconductive organic cords may be used. In any case, to provide a conductivity for the belt 7, the belt cords are rubberized with a topping rubber which is a conductive rubber compound having a volume resistivity of less than 100 megaohm cm.

The above-mentioned tread portion 2 comprises a tread rubber 11 as the radially outermost rubber layer defining the ground contacting region 2S. The tread rubber 11 extends over the entire width of the tread portion 2. The tread rubber 11 is made of a high performance rubber compound which is designed with much importance attached to the wear resistance, rolling resistance, wet performance and the like rather than the electrical conductivity. The compound contains 30 to 100 phr, preferably 40 to 70 phr of silica in the base rubber material, but the carbon black content is limited to at most 15 phr, preferably 10 phr. As a result, it has a volume resistively of more than 100 megaohm cm and thus nonconductive.

Further, the tread portion 2 is provided in the ground contacting region 2S with tread grooves G.

According to the present invention, the tread grooves G may include various grooves, e.g. circumferential grooves, bias grooves, axial grooves and the like. And static electricity grounding means are provided in the tread grooves G.

The static electricity grounding means 12 comprises a collector 12A and grounding terminals 12C which are made of a conductive rubber compound.

Figure 2A:
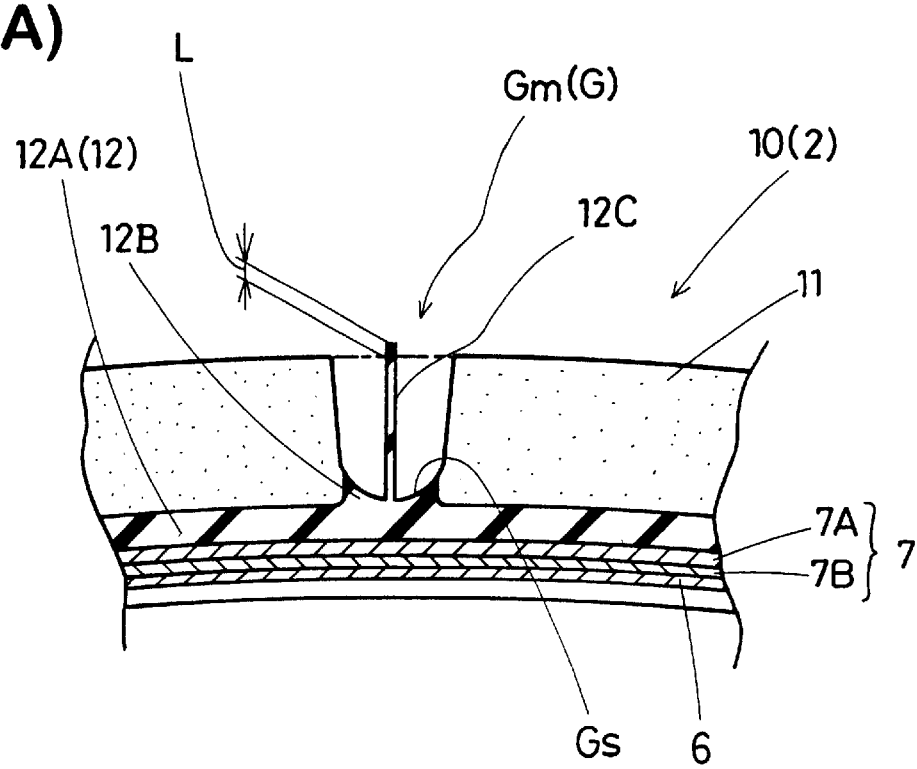
Figure 2B:
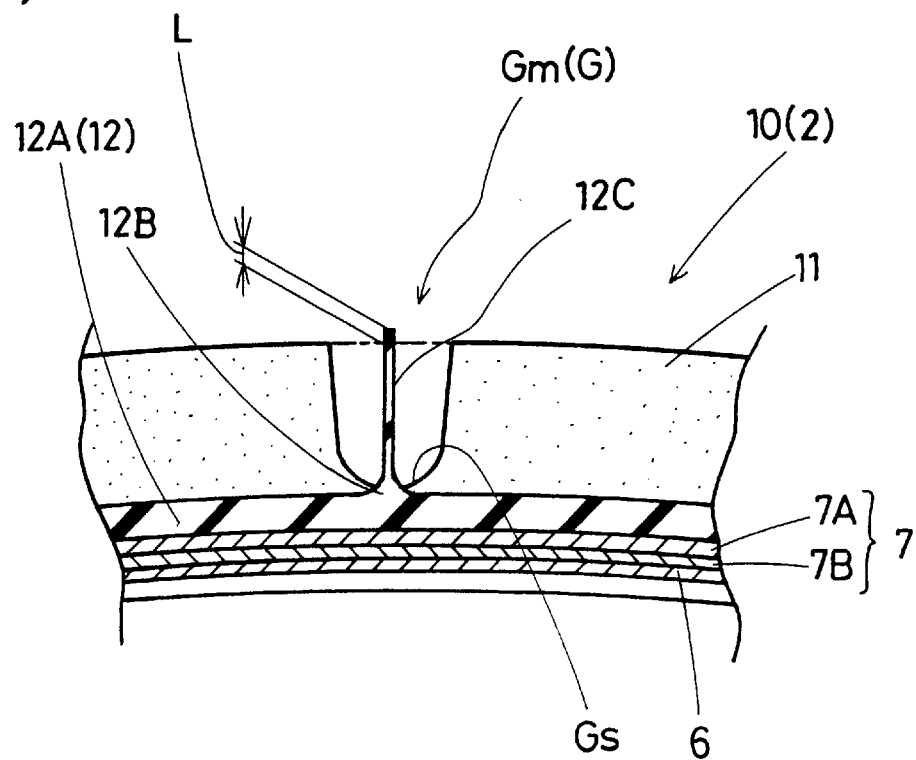

As shown in FIGS. 2(A) and 2(B), the collector 12A is disposed radially inside the tread rubber 11 and on the radially outer surface of the conductive belt 7. The grounding terminals 12C are disposed in the tread grooves G.

The collector 12A is relatively thin not to hinder the tread rubber 11 from decreasing the rolling resistance of the tire. The thickness thereof is preferably set in the range of from 1 to 4 mm.

The grounding terminals 12C extend radially outwardly from the collector 12A to the level of the tread surface at least. Usually, they extend slightly beyond the tread surface. Preferably, the length L of the protruding part is set in the range of from 2 to 8 mm when the tire is new.

Further, the thickness of each of the static electricity grounding terminals 12C is set in the range of from 0.5 to 3.0 mm, preferably 1.0 to 2.0 mm, whereby a flexibility suitable for providing a sufficient electrical contact with the ground can be obtained. Here, the thickness may occur in any direction, namely tire circumferential direction, axial direction or the like. In the case of ground contacting terminals 12C having different thickness in different directions such as elliptical or rectangular cross sections the thickness is the maximum thickness. In such cases, the minimum thickness is at least equal to 0.5 mm to provide the required minimum strength. Furthermore, if the thickness is less than 0.5 mm, it is difficult to obtain a required minimum strength, and the electrical resistance becomes very high. If more than 3.0 mm, as the rigidity increases, tearing-off is liable to occur when taking the tire from a mold.

It is necessary that the number of the grounding terminals 12C in the ground contacting patch is at least one, preferably at least five, more preferably more than ten. In this embodiment, the grounding terminals 12C are formed in each of circumferential grooves at a substantially regular intervals of 1.0 to 3.0 cm.

The static electricity grounding terminals 12C may have various cross sectional shapes (round, rectangle, polygons, etc) when viewed from the radially outside. However, a round shape is preferred.

In this embodiment, the collector 12A extends over the entire width of the tread portion 2, but it can be formed in a narrower width. Further, it may be formed as separate parts disposed radially inside the tread grooves G, respectively.

The conductive rubber compound contains at least 15 phr, preferably more than 20 phr, more preferably more than 40 phr of carbon black in the base rubber material so as to have a volume resistivity of less than 100 megaohm cm. As far as the relatively low volume resistivity in this range can be maintained, a smaller amount of silica may be add to utilize its excellent properties.

In general, the volume resistivity of a conductive rubber has a close relationship with the content and average particle diameter of the carbon black. As to the carbon black used in the above-mentioned conductive rubber, the ratio Wc/Nc of the content Wc in phr of the carbon black to the average particle diameter Nc in nm of the carbon black is preferably set in the range of not less than 1.5. Particularly, hard carbon whose average particle diameter Nc is not more than 30 nm is preferably used. As a result, a necessary conductivity can be stably secured.

For the base rubber materials for the conductive rubber compound and the above-mentioned less-conductive or non-conductive rubber compound for the tread rubber, diene rubber such as natural rubber (NR), styrene butadiene rubber (SBR), butadiene rubber (BR), isoprene rubber (IR) and the like can be used, either alone or in combination. Further, various additives such as sulfur, vulcanizing accelerator, age resistance and the like may be used.

In FIG. 2(A), the collector rubber 12A is exposed in the groove bottom Gs. However, it is also possible that the collector rubber 12A is covered with the tread rubber 11 as shown in FIG. 2(B). Further, in order to improve the resistance to tearing-off, it is possible to gradually increase the thickness of a root part 12B of the grounding terminal 12C as shown in FIG. 2(B).

Incidentally, from the collector 12A to the outer surface of the bead portions 4 contacting with a wheel rim, an electrical path is formed by conductive rubber layers disposed in the sidewall portions and bead portions, and/or conductive topping rubber for reinforcing cords such as the carcass cords, belt cords and the like, and if applicable, conductive reinforcing cords such as steel belt cords and the like.

The above-mentioned grounding terminals 12C can be formed by simply making holes in the inner surface of a tire vulcanizing mold. The positions of those holes are on the tip of ribs which are negative impressions of the tread grooves G.

Comparison Test

Figure 3:
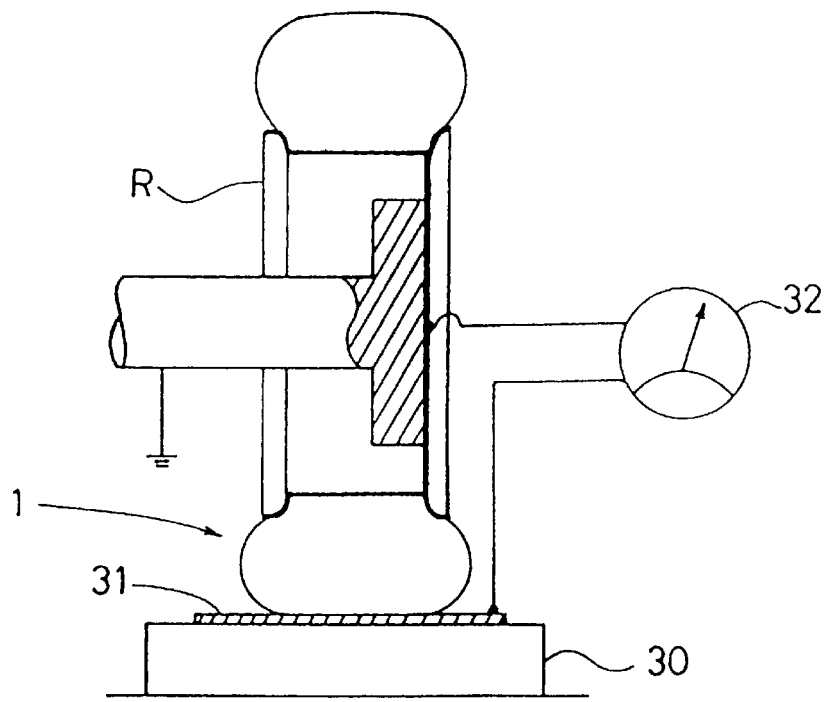
FIG. 3 is a diagram for explaining a method of measuring the electrical resistance of a tire.
Figure 4:
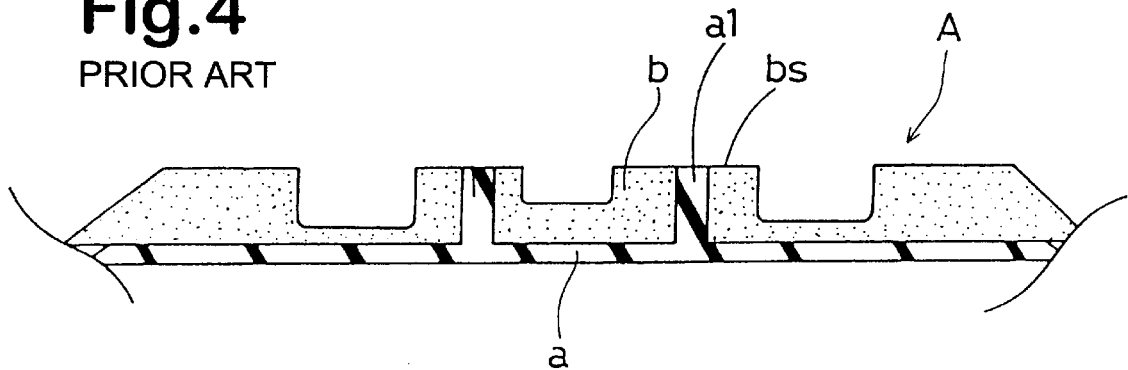
FIG. 4 is a cross sectional view showing the prior art.

Test tires of size 195/65R14 were made and the electrical resistance was measured. The test tires were the same structure shown in FIG. 1 except for the ingredients of the tread rubber compounds and the number and size of the terminals. The electrical resistance was measured according to a German method, WDK, Blatt 3. As shown in FIG. 3, the test tire 1 mounted on a standard rim R (size 6×14) and inflated to a pressure of 200 kpa was pressed against a copper plate 31 on a table 30 by applying a tire load (150, 250, 350 and 450 kg), and the electrical resistance between the rim R and the plate 31 was measured with a ohm meter 32, applying 1000 volts therebetween. The temperature was 25 degrees C, and the humidity was 50%.

TABLE 1

| Tire | Ref. 1 | Ref. 2 | Ex. 1 | Ex. 2 | Ex. 3 | Ex. 4 |
| --- | --- | --- | --- | --- | --- | --- |
| Carbon black (phr) | | | | | | |
| Tread rubber | 5 | 5 | 5 | 5 | 5 | 5 |
| Conductive rubber | 0 | 30 | 30 | 30 | 30 | 30 |
| Terminal | none | none | round | round | round | round |
| Diameter (mm) | | | 1.2 | 1.2 | 1.2 | 1.2 |
| Number *1 | 0 | 0 | 5 | 10 | 15 | 20 |
| Electric resistance of tire (megaohm) Tire load | | | | | | |
| 150 kg | over 2000 | over 2000 | 365 | 50 | 4.53 | 1.2 |
| 250 kg | over 2000 | over 2000 | 588 | 56.2 | 4.76 | 1.43 |
| 350 kg | over 2000 | over 2000 | 621 | 75.2 | 4.98 | 1.59 |
| 450 kg | over 2000 | over 2000 | 888 | 88.4 | 5.04 | 2.21 |

*1 The number counted in the ground contacting patch.

As described above, the pneumatic tire according to the present invention has the static electricity grounding means which are provided, as flexible terminals, in the tread grooves formed in the low-hysteresis-loss tread rubber. Therefore, the problems in the above-mentioned prior art can be solved, and excellent dynamic performances derived from the silica-reinforced rubber and a good static-electricity-grounding effect can be maintained for a long term.

What is claimed is:

1. A pneumatic tire comprising:

a tread rubber extending over a ground contacting region of the tire, tread grooves disposed in the ground contacting region, each tread groove having sidewalls, static electricity grounding means comprising grounding terminals and a collector, the collector and grounding terminals being made of a conductive rubber compound containing at least 15 phr of carbon black to have a volume resistivity of less than 100 megaohm cm, and the tread rubber being made of a low-hysteresis-loss rubber compound containing silica as a reinforcing agent and having a volume resistivity more than that of the electrically conductive rubber compound, said collector disposed radially inside the tread grooves, and said grounding terminals disposed in the tread grooves and extending radially outwardly from the collector to the level of the ground contacting region at least, wherein each grounding terminal is spaced from both sidewalls of the tread grooves in which it is disposed and has a thickness of from 0.5 to 3.0 mm.

2. The pneumatic tire according to claim 1, wherein the grounding terminals protrude radially outwardly from the top of the tread grooves by a length of from 2 to 8 mm.

3. The pneumatic tire according to claim 1, wherein
the grounding terminals have a round cross sectional shape.

4. The pneumatic tire according to claim 1, wherein
the grounding terminals are formed in circumferential grooves at a substantially regular intervals of 1.0 to 3.0 cm.

5. The pneumatic tire according to claim 1, wherein
the number of the grounding terminals in the ground contacting patch is at least five.

6. The pneumatic tire according to claim 1, wherein
the thickness of each grounding terminal gradually increases in its root part.

7. The pneumatic tire according to claim 1, wherein the collector is exposed in the groove bottom.

8. The pneumatic tire according to claim 1, wherein the collector is covered with the tread rubber in the groove bottom.

9. The pneumatic tire according to claim 1, wherein
the collector extends over the width of the tread portion.

10. The pneumatic tire according to claim 1, wherein
the collector is made up of separate parts disposed radially inside the tread grooves, respectively.

* * * * *